J. H. BROMLEY, Jr.
LACE MACHINE.
APPLICATION FILED JULY 3, 1909.
1,066,789.
Patented July 8, 1913.
7 SHEETS—SHEET 1.
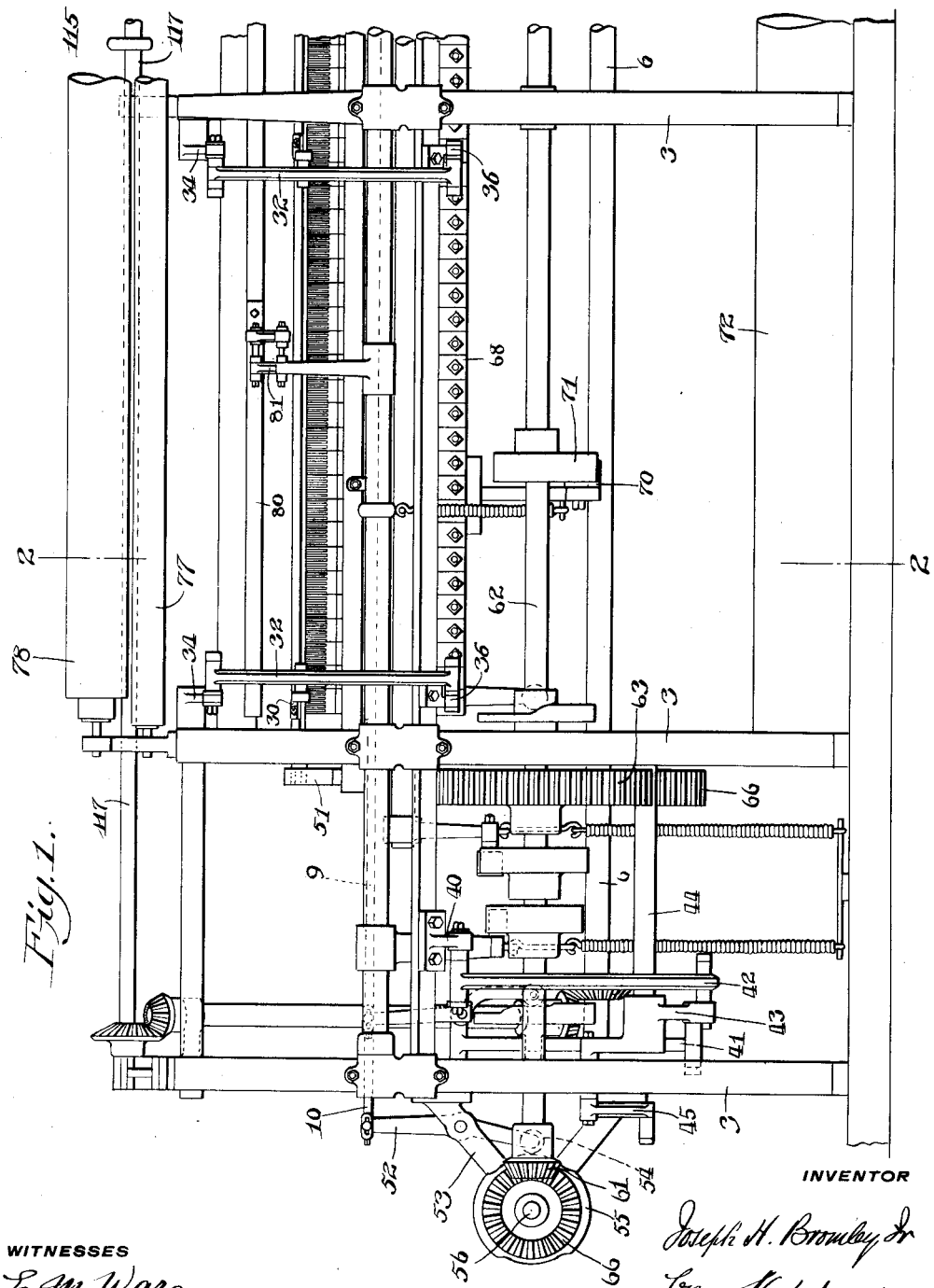
WITNESSES
E. M. Ware
O. M. Biddle
INVENTOR
Joseph H. Bromley Jr.
by H. J. Heaton
ATTORNEY

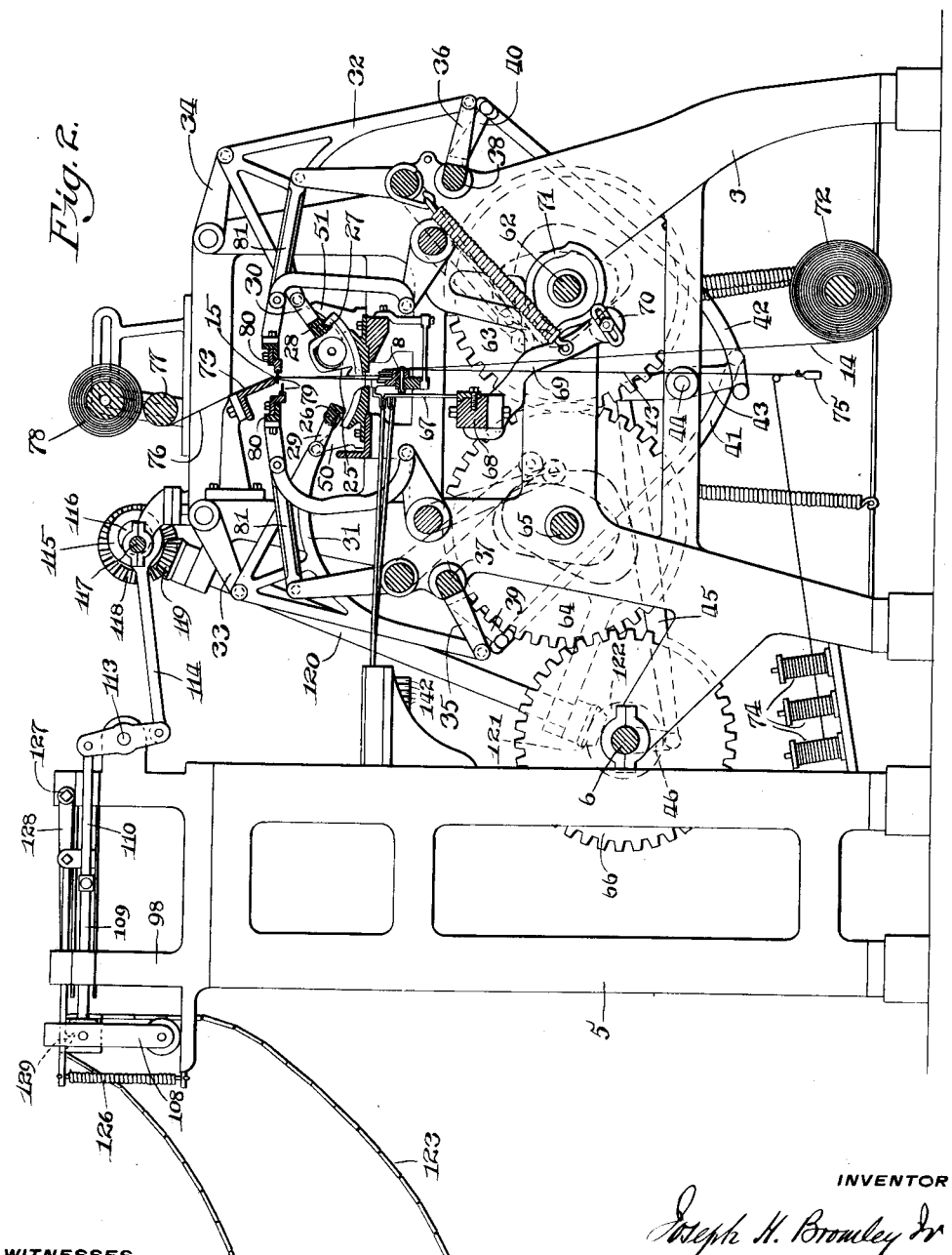

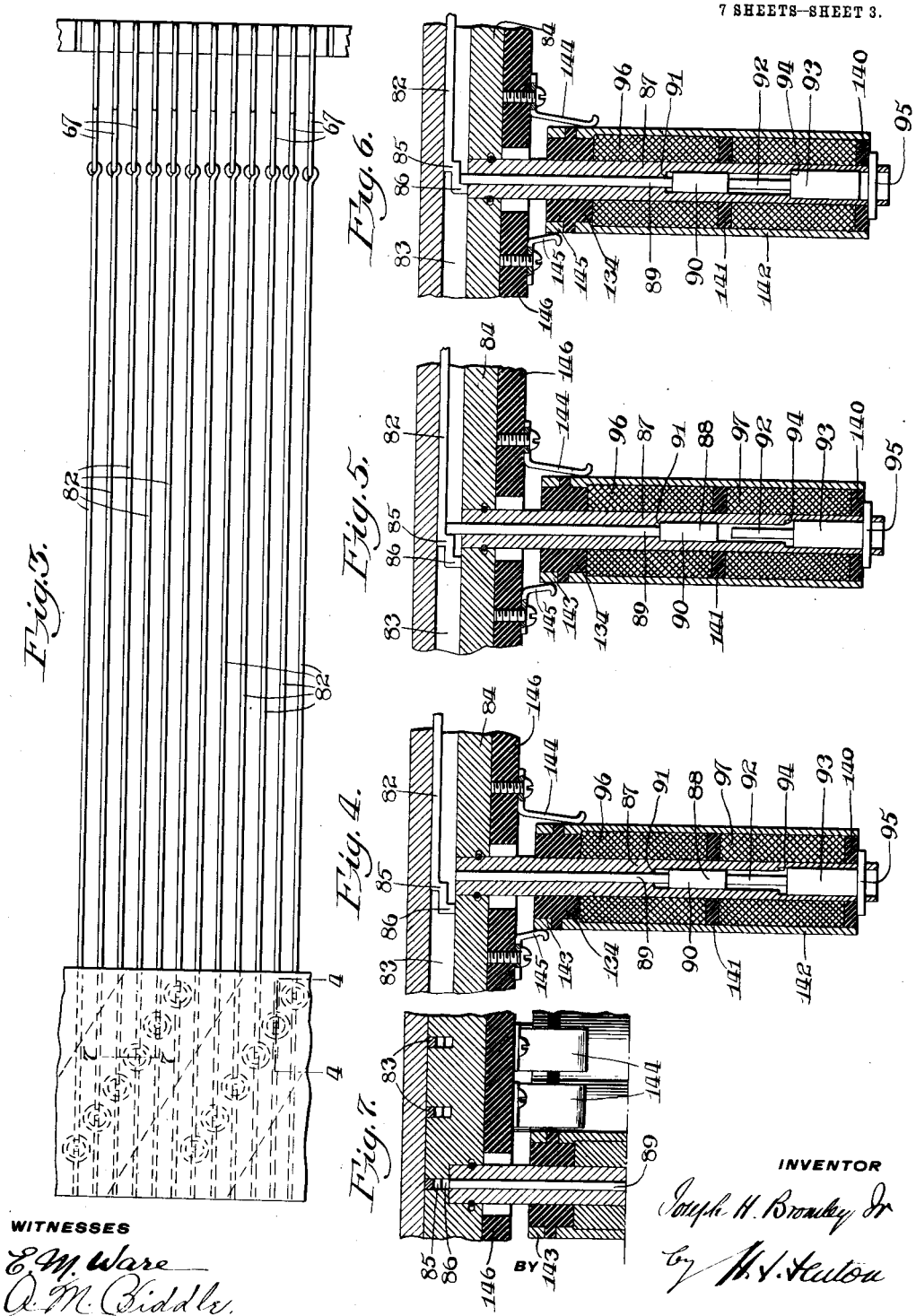

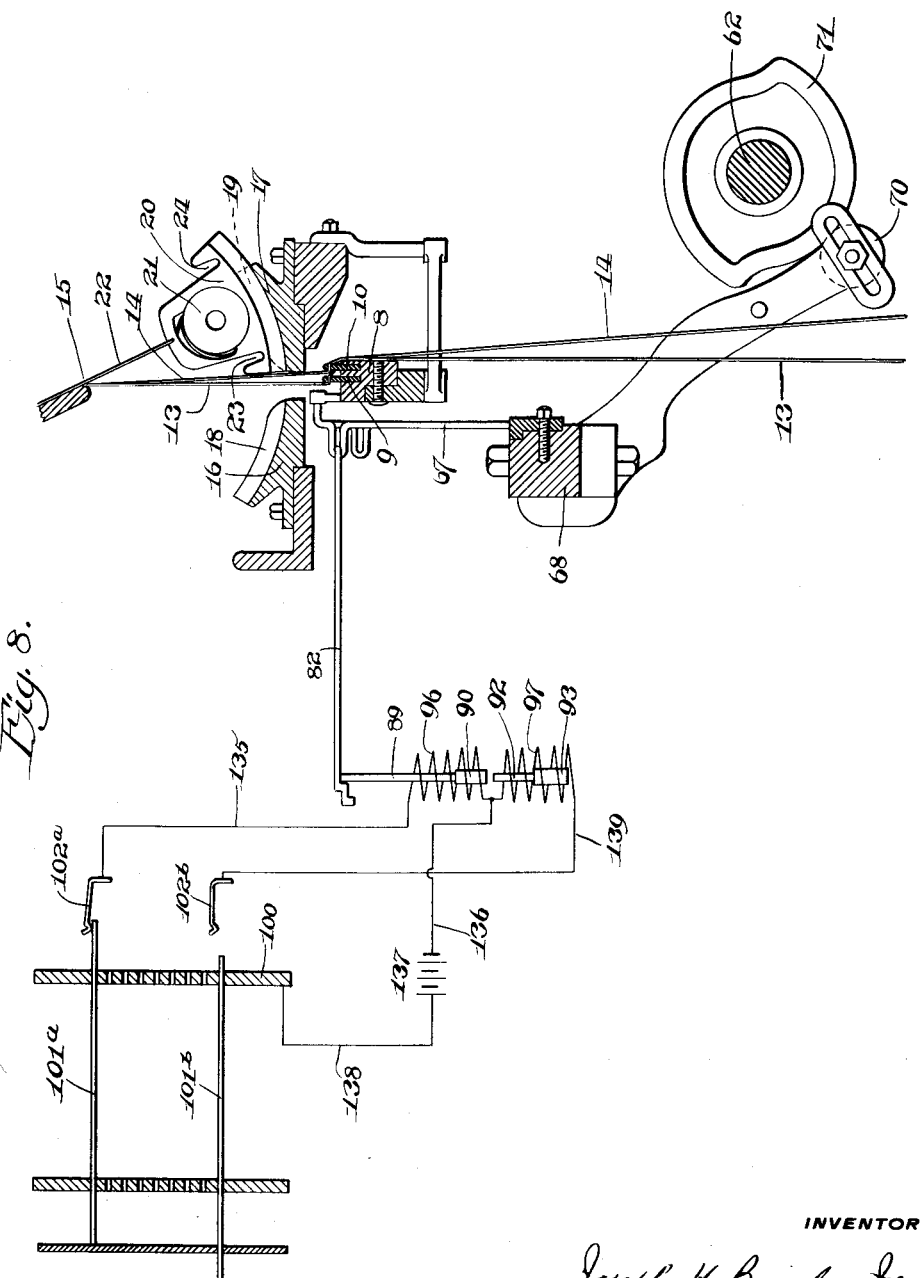

J. H. BROMLEY, Jr.
LACE MACHINE.
APPLICATION FILED JULY 3, 1909.
1,066,789.
Patented July 8, 1913.
7 SHEETS—SHEET 5.
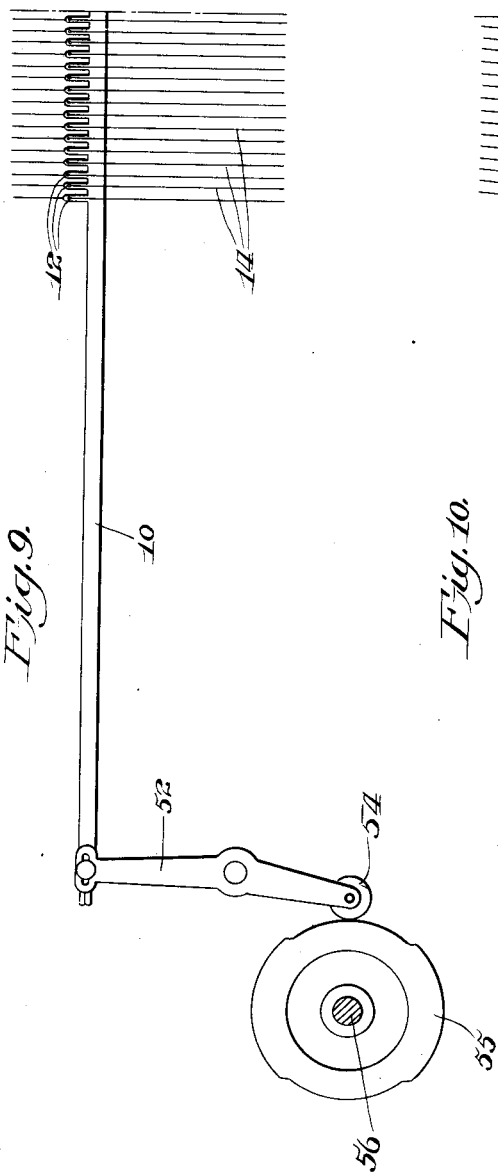
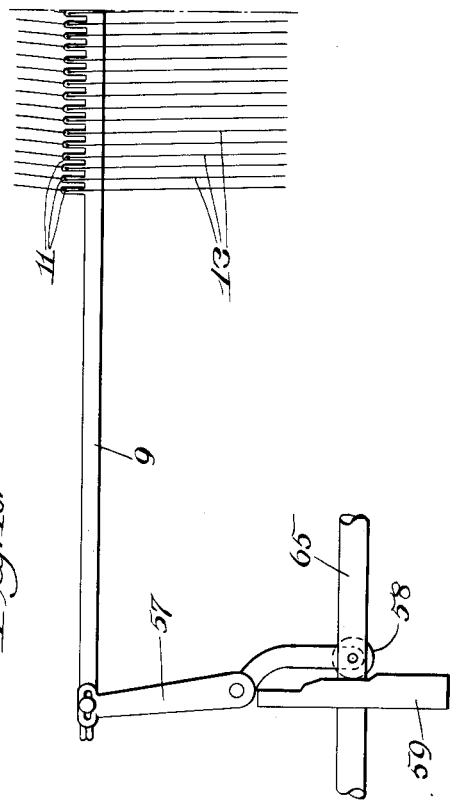

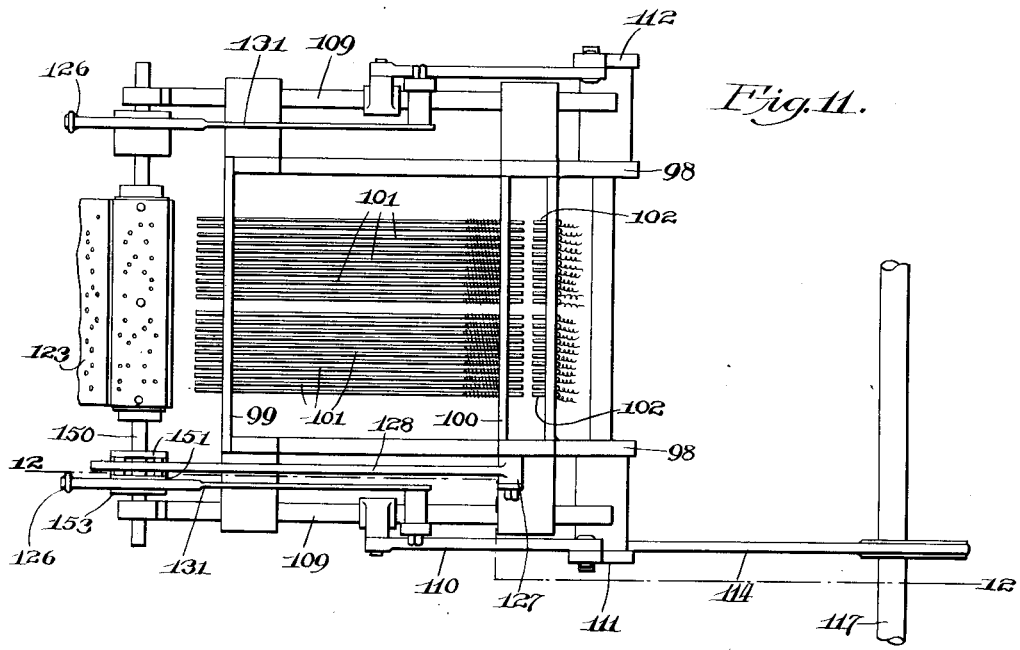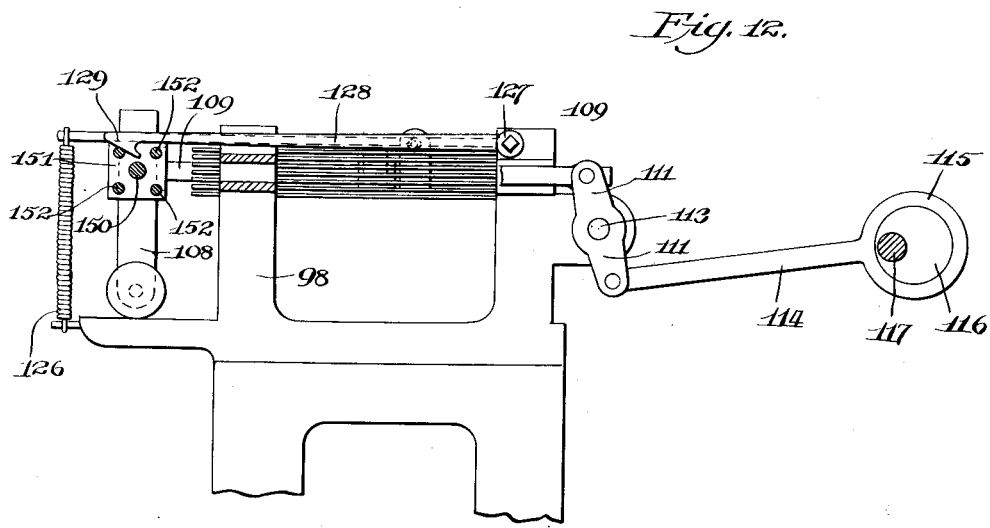

J. H. BROMLEY, Jr.
LACE MACHINE.
APPLICATION FILED JULY 3, 1909.
1,066,789.
Patented July 8, 1913.
7 SHEETS—SHEET 7.
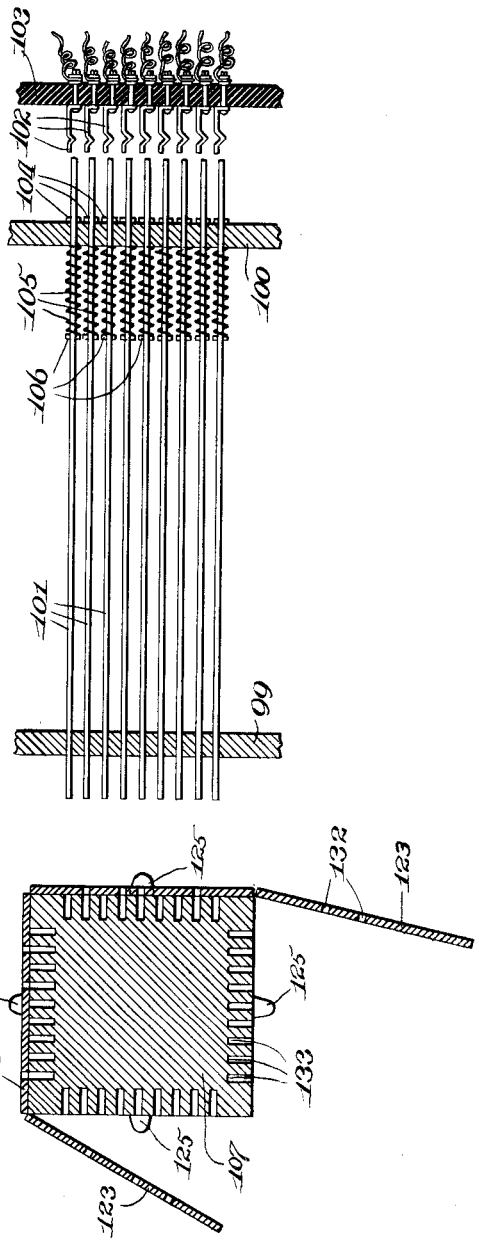
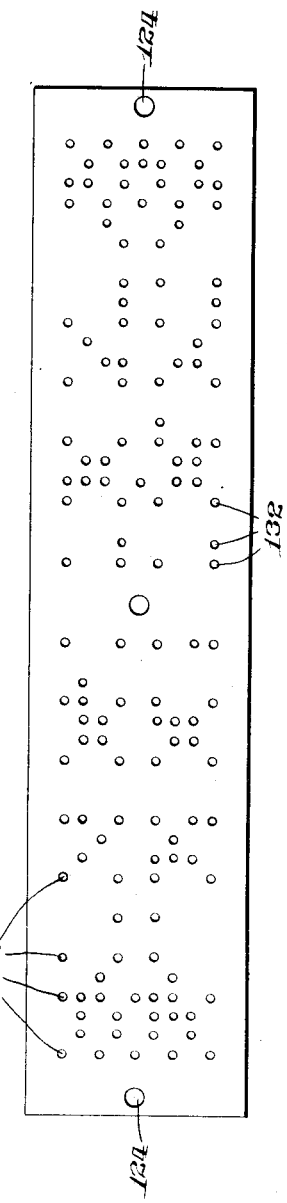
WITNESSES
E. M. Ware
O. M. Biddle
INVENTOR
Joseph H. Bromley Jr.
BY H. J. Heaton
ATTORNEY

UNITED STATES PATENT OFFICE.

JOSEPH H. BROMLEY, JR., OF PHILADELPHIA, PENNSYLVANIA.

LACE-MACHINE.

1,066,789.　　　　Specification of Letters Patent.　　Patented July 8, 1913.

Application filed July 3, 1909.　Serial No. 505,814.

*To all whom it may concern:*

Be it known that I, JOSEPH H. BROMLEY, Jr., a citizen of the United States, residing in the city of Philadelphia, State of Pennsylvania, have invented certain new and useful Improvements in Lace-Machines, of which the following is a full, clear, and exact description, reference being had to the accompanying drawings, forming a part of this specification.

My invention relates to lace machines wherein, as their principal differentiating feature in the method of interlacing the set or sets of threads employed, the thread-controlling devices employed operate to move one set of threads between and also around another set or sets of threads, in contradistinction to ordinary weaving methods wherein the threads of one set are merely moved between and not around another and transverse set. To effect the action aforesaid in lace machines, the thread-controlling jacks are required to be of such character as to present two thread-controlling surfaces, normally held out of operative planes, mounted to be independently moved, and actuated by mechanisms adapted to operate them accordingly. Such machines comprise mechanism for operating a set or sets of threads, a set of bobbin-carrying shuttles, mechanism for operating the shuttles with respect to the set or sets of threads to interlace the threads delivered from the bobbins with the threads of said set or sets, and a set of thread-controlling devices movable independently of each other and adapted to control the operation of said set or sets of threads with respect to the shuttles in accordance with a prescribed design to be produced in the lace or product of the loom.

The object of the invention is to provide a novel, simple and efficient means for selecting and controlling the thread-controlling devices including electric circuits and devices for opening and closing the circuits in accordance with a prescribed design.

With this object in view, the invention consists in the novel construction and combinations of parts hereinafter described and pointed out in the claims.

In the drawings:—Figure 1 is a front elevation of a lace machine, partly broken away, embodying my invention. Fig. 2 is a vertical section thereof, on line 2—2 of Fig. 1. Fig. 3 is a plan view of a number of the thread-selecting and controlling devices, the operating magnets therefor, and the connections between the thread-controlling devices and the magnets. Fig. 4 is a vertical section through a pair of magnets and adjuncts for controlling one thread-controlling device, on line 4—4 of Fig. 3. Figs. 5 and 6 are views similar to Fig. 4, showing the parts in different positions. Fig. 7 is a section on line 7—7 of Fig. 3. Fig. 8 is an enlarged section of parts of the machine, showing the jacks or thread-controlling devices and adjuncts, and showing diagrammatically the electrical connections for the operating devices for one of the jacks. Fig. 9 is a view of a portion of the guide bar for one set of threads and its operating cam. Fig. 10 is a view of a portion of the guide bar for the other set of threads and its operating cam. Fig. 11 is a plan view of the jacquard mechanism for controlling the electric circuits. Fig. 12 is a vertical section on line 12—12 of Fig. 11. Fig. 13 is a vertical section through parts of the electrical contact making and breaking mechanism operated by the jacquard card. Fig. 14 is a face view of one of the jacquard cards.

Referring now to said drawings 3 designates the main frame of the machine, and 5 a supplemental frame adjacent the main frame.

6 designates the main driving shaft which is journaled in suitable bearings in the main frame 3. The main frame 3 supports a bar 8 which extends longitudinally of the machine and is provided in its upper portion with longitudinal parallel slots into which thread-guiding bars 9 and 10 are slidingly fitted. The upper portions of the bars 9 and 10 are provided with eyes or openings 11 and 12 respectively. The eyes 11 receive one set of threads 13 and the eyes 12 receive another set of threads 14.

The threads 14 are drawn from a roll 72 to and through the eye 12 in the bar 10, and thence to the lace being formed at the lower edge 15 of a fixed bar 73. These threads 14 are commonly termed the warp threads, and they form the main structure of the lace.

The threads 13 are drawn from suitably supported spools 74 to and through suitable tension and take-up devices 75, thence to and through the eyes or openings 11 in the bar 9 and thence to the lace being formed at the lower edge 15 of the bar 73. These threads 13 are figuring threads and are employed to form plain or shaded figures in the lace being produced, and are commonly termed spool threads.

After the lace has been formed at the lower edge 15 of the bar 73, the finished lace 76 passes over the bar 73 to and around a roller 77 to a take-up roller 78.

The set of threads 13 extends from the bar 9 to the bar 73 through one plane, and the other set of threads 14 extends from the bar 10 to the bar 73 through another plane a slight distance from the plane of the threads 13 directly above the bars 9 and 10.

Supported by the main frame of the machine directly above the bars 9 and 10 are two longitudinal comb bars 16 and 17, one arranged on one side and the other arranged on the other side of the sets of threads 13 and 14. These bars 16 and 17 are provided with transversely-arranged curved guide-ways 18 and 19 therein which are arranged parallel to and in line with each other. Slidingly fitted to these guide-ways 18 and 19 are the lower curved portions of a set of thin plate-like shuttles 20, each of which carries a flat bobbin 21 from which a thread 22 is delivered to the fabric or lace being produced by the machine. The shuttles 20 are arranged side by side, and the row or set of shuttles extends parallel to the two sets of threads 13 and 14. The set of shuttles 20 is adapted to be moved bodily through the planes of the two sets of threads 13 and 14 from the guide-ways 19 in the bar 17 to the guide-ways 18 in the bar 16, and back again, in a manner to move the shuttles 20 and bobbins 21 carried thereby through and from side to side of the two sets of threads 13 and 14. For this purpose each shuttle 20 is provided with a notch 23 on one side thereon and a notch 24 on the opposite side thereof. The notches 23 are adapted to be engaged by a rib or tooth 25 on a longitudinal catch bar 26, and the notches 24 are adapted to be engaged by a rib or tooth 27 on a longitudinal catch bar 28.

The bars 26 and 28 are carried by arms 29 and 30 respectively, which are pivotally mounted on bell crank levers 31 and 32 respectively. The bell crank levers 31 and 32 are pivotally mounted on arms 33 and 34 respectively which are pivotally connected to the main frame of the loom. The bell crank levers 31 and 32 are also connected to arms 35 and 36 respectively, which project from rock shafts 37 and 38 respectively, mounted in the main frame. The rock shafts 37 and 38 are provided with arms 39 and 40 respectively, which are connected by arms 41 and 42 respectively to the lower end of a lever 43 which is pivotally mounted on a shaft 44 on the main frame 3. The upper end of the lever 43 is connected by a bar 45 to a crank 46 on the main driving shaft 6, whereby, during the rotation of the main shaft, the lever 43 will be rocked back and forth, thereby rocking the bell crank levers 31 and 32 back and forth through their connections with the lever 43 and the main frame 3. This operation of the bell crank levers 31 and 32 moves the bars 26 and 28 toward and from the threads 13 and 14, and during the movement of the bars 26 and 28 they are raised and lowered on their pivotal connections with the bell crank levers 31 and 32 by rollers carried by the arms 29 and 30 and engaging cams 50 and 51 respectively. The timing of the bars 26 and 28 with respect to each other is such that the bar 28 having its rib or tooth 27 engaged with the shuttles 20 will move the set of shuttles into and through the planes of the threads 13 and 14 from one side thereof, and after the shuttles have been projected through the planes of the threads the rib or tooth 25 of the bar 26 will engage the shuttles and complete the movement thereof to the other side of the planes of threads, while the rib or tooth 27 of the bar 28 is disengaged from the shuttles. Thus the shuttles 20 are moved from side to side of the sets of threads 13 and 14 during the operation of the loom.

During the operation of the loom, the thread-guiding bars 9 and 10 are moved longitudinally in the slots in the bar 8 to shift the sets of threads 13 and 14 with respect to the shuttles 20, so that the shuttles 20, in passing from side to side of the planes of the sets of threads 13 and 14 may pass between different adjacent threads of the two sets of threads each time the shuttles 20 are moved for the proper interlacing of the bobbin threads 22 with the threads 13 and 14.

The bar 10 is connected to the upper end of a lever 52 pivoted to a bracket 53 on the main frame 3. The lower end of the lever 52 is provided with a roller 54 engaging a cam 55 on a shaft 56, whereby, during the rotation of the shaft 56, the lever 52 will be rocked in a manner to move the bar 10 longitudinally to shift the set of threads 13 with respect to the shuttles 20.

The shaft 56 is provided with a beveled gear wheel 66 which coacts with a similar wheel 61 on a cam shaft 62 extending longitudinally of the loom. The cam shaft 62 is provided with a gear wheel 63 which coacts with a similar wheel 64 on another cam shaft 65. The gear wheel 64 is in mesh with a gear wheel 66 on the main driving shaft 6, whereby, through the gearing just described, the cam shafts 62 and 65 are rotated and the cam shaft 56 carrying the cam 55 is also rotated.

The bar 9 is connected to the upper end of a lever 57 pivoted to a bracket on the main frame 3. The lower end of the lever 57 is provided with a roller 58 engaging a cam 59 on the cam shaft 65 hereinbefore mentioned, whereby, during the rotation of the shaft 65, the lever 57 will be rocked in a manner to move the bar 9 longitudinally to shift the set of threads 14 with respect to the shuttles 20.

As the lace is being produced by the interlacing of the bobbin threads 22 with the spool and warp threads 13 and 14 respectively through the manipulation of the devices controlling said threads, the interlaced threads are beaten up to the lower edge 15 of the bar 73 by two sets of pins 79 carried by two longitudinal bars 80 arranged parallel to the two sets of threads 13 and 14 and between which said threads pass. The bars 80 are carried by suitable arms 81 which are operated to move the bars 80 in a manner to cause the rows of pins 79 carried thereby to be lowered and projected between the adjacent interlaced threads and then raised to beat up the interlaced threads to the lower edge 15 of the bar 73, and then withdrawn therefrom. As rapidly as the interlaced threads are beaten up by the pins 79, the lace thus formed is taken up by the roller 78. The means for moving the point bars may be the same as those employed in many of the well known levers machine.

Arranged parallel to the sets of threads 13 and 14 and shuttles 20, is a set of thread-controlling devices or jacks 67 for the threads 13 and 14. These thread-controlling devices or jacks 67 extend upwardly, parallel to each other, from a bar 68, the lower ends of the jacks being secured to the bar. The set of jacks 67 is arranged adjacent to the bar 8 and the upper ends of the jacks 67 are extended toward the threads 13 and 14 above the bars 9 and 10, the upper ends of the jacks extending into guide slots on the bar 8. Normally, the upper ends of the jacks 67 are away from the two planes occupied by the two sets of threads 13 and 14, and the upper ends of the jacks are adapted to be projected into said planes as will be hereinafter described.

The bar 68 is mounted to be rocked on its longitudinal axis, and the bar is provided with an arm 69 carrying a roller 70 which is engaged by a cam 71 on the cam shaft 62, whereby, when the shaft 62 is rotated during the operation of the machine, the bar 68 will be rocked on its axis in a manner to project the upper ends of the jacks 67 into and through the two planes occupied by the two sets of threads 13 and 14.

The jacks 67 are made of spring metal, and each jack may be held independently of the other jacks against being projected into the planes of the threads 13 and 14 during the operation of the bar 68, while the jacks not so held are being projected; or each jack may be arrested independently of the other jacks after its upper end has been projected into the plane of the set of threads 13 and before it has entered the plane of the set of threads 14.

The operation of the bar 68 with respect to the movement of the shuttles 20 and the bars 9 and 10 is such that the bar 68 is rocked to project the upper ends of the jacks 67 into the planes of the threads 13 and 14 before the bars 9 and 10 are moved to adjust the two sets of threads 13 and 14 with respect to the shuttles 20.

If all the jacks 67 be projected into the two planes of the two sets of threads 13 and 14, the movement of said threads under the influence of the bars 9 and 10 will be arrested by the engagement of the threads with the jacks. If, however, certain of the jacks 67 are prevented from being moved by the bar 68 into either of the two planes of the two sets of threads 13 and 14 or are permitted to be moved into the plane of the set of threads 13 and prevented from being moved into the plane of the set of threads 14, only such threads as are engaged by the projected jacks will be prevented from being moved by the bars 9 and 10 with respect to the shuttles 20. Thus it will be seen that the manner of interlacing the bobbin threads 22 with the spool and warp threads 13 and 14 may be controlled by the manipulation of the thread-controlling devices or jacks 67 in conjunction with the operation of the bars 9 and 10 as the shuttles 20 are moved from side to side of the two sets of threads 13 and 14 through the planes occupied thereby. During the operation of the machine, the bobbin threads 22 are wrapped around the spool threads 13 and the warp threads 14 in such a manner as to tie certain spool threads or figuring threads to certain warp threads and to tie certain warp threads together. Thus, plain or shaded figures may be produced in the lace by floating the spool or figuring threads between two or more adjacent warp threads 14 and tying the spool threads 13 to the warp threads 14 at each end of the float by the bobbin threads 22; or open work may be produced in the lace, as is common and well known in this art.

During the interlacing of the bobbin threads 22 with the two sets of threads 13 and 14, the bars 9 and 10 are moved longitudinally back and forth to bodily shift the sets of threads 13 and 14 with respect to each other and to the shuttles 20, and certain or all of the jacks 67 are projected into the planes occupied by the sets of threads 13 and 14 to be engaged thereby to control the positions to which the threads may be shifted by the bars 9 and 10 with respect to the shuttles 20, and thereby control the manner of interlacing the bobbin threads 22 with the threads 13 and 14 for the production of lace having a particular form or design as dictated by the operation of the jacks 67; the jacks 67, by devices hereinafter described, being sellected and controlled independently of each other as to which jacks shall be projected into the plane of the set of threads 13 for the control thereof, which jacks shall be projected into the plane of the set of threads 14 for the control thereof, and which jacks shall not be projected into the plane of either set of threads 13 or 14 to permit certain of said threads to be shifted to the full extent with relation to the shuttles 20 by the operation of the bars 9 and 10.

Thus far the construction and operation of the lace machine are common and well known and no detailed description or illustration thereof is deemed necessary herein.

I shall now proceed to describe the means for selecting and controlling the thread-controlling devices or jacks 67 during the operation of the machine.

Extending rearwardly from each jack or thread-controlling device 67 is a part or arm 82. The forward ends of the arms 82 are connected to the jacks 67, one arm to each jack, and the rearward ends of the arms 82 extend into and are slidingly fitted to guide slots 83 cut in the top of a horizontal plate 84 which is supported on the supplemental frame 5. The arms 82 are longitudinally movable independently of each other with the jacks 67, the rearward portions of the arms 82 being guided by the side walls of the slots 83.

The rearward end of each part or arm 82 extends downwardly and rests upon the bottom of its slot 83 and supports the main body of the arm 82 above the bottom of said slot. The downwardly-extending rearward end of each arm 82 provides two stop-engaging faces or abutments 85 and 86 which are located in different horizontal planes and also in different vertical planes transversely of the arm 82, as shown in Figs. 4 to 6, for a purpose hereinafter explained.

Directly under the rearward end of each arm 82 is a vertically-arranged tube 87, the upper end of which extends into an opening in the plate 84 and is suitably secured therein and electrically connected thereto. Each tube 87 extends downwardly from the plate 84 and slidingly fitted to the interior of each tube in a two-part stop or pin 88. The upper end of the two-part pin 88 is flush with the bottom of the slot 83 containing the arm 82 directly above the tube 87, and the upper end of the pin is adapted to be raised or projected into the slot 82 and into either the horizontal plane occupied by the abutment 85 or the horizontal plane occupied by the abutment 86.

The upper part 89 of the two-part pin 88 is movable independently of the lower part 92 of the pin, and is provided with an enlarged bottom portion 90 which is adapted to abut against a shoulder 91 within the tube 87 and limit the movement of the upper part 89 of the pin after its upper end has been moved into the horizontal plane occupied by the abutment 85.

The lower part 92 of the two-part pin 88 is provided with an enlarged bottom portion 93 which is adapted to abut against a shoulder 94 within the tube 87 and limit the movement of the lower part 92 of the pin after it has moved the upper end of the upper part 89 into the horizontal plane occupied by the abutment 86.

A two-part pin is provided for each arm 82, and therefore a description of one will suffice for all.

The lower part 92 of the two-part pin rests normally upon a transverse pin 95 extending through the bottom of the tube 87, and the upper part 89 of the two-part pin rests normally upon the top of the lower part 92 thereof, with the top of the upper part 89 flush with or below the bottom of the slot 83 occupied by the arm 82 directly over the pin. It will thus be seen that the upper part 89 of the pin may be raised into engagement with the abutment 91 of the tube 87 independently of the lower part 92 to bring the upper end of the pin into the horizontal plane occupied by the abutment 85 of the arm 82, and that the raising of the lower part 92 of the two-part pin into engagement with the abutment 94 of the tube 87 will also raise the upper part 89 of the pin to bring its upper end into horizontal plane occupied by the abutment 86 of the arm 82.

In order to raise the upper part 89 of the pin independently of the lower part 92 thereof, I provide an electromagnet in the form of a solenoid 96 which surrounds a portion of the tube 87 and the lower portion of the upper part 89 of the two-part pin 88, and which, when supplied with electric current, will raise the upper part 89 of the pin, independently of the lower part 92 thereof and into engagement with the abutment 91 of the tube 87.

In order to raise the lower part 92 of the pin and thereby raise the upper part 89 thereof to the extent to which the lower part 92 is raised, I provide an electromagnet in the form of a solenoid 97 which surrounds a portion of the tube 87 and the lower part 92 of the two-part pin 88, and which, when supplied with electric current, will raise the lower part 92 of the pin into engagement with the abutment 94 of the tube 87. It will thus be seen that when the upper solenoid 96 is energized, the end of the upper part 89 of the two-part pin will be raised into the horizontal plane occupied by the abutment 85 of the arm 82, and that when the lower solenoid 97 is energized the lower part 92 of the two-part pin will be raised only a sufficient distance to raise the upper part 89 of the pin to bring its upper end into the horizontal plane occupied by the abutment 86 of the arm 82.

The abutments 85 and 86 of each arm 82 are so located with respect to the two-part pins 88 for the arms and with respect to the planes occupied by the two sets of threads 13 and 14, that when the bar 68 is rocked to project the upper ends of the jacks 67 through the planes occupied by both sets of threads 13 and 14, each jack will be projected into the planes of both sets of threads 13 and 14, if the two-part pins 88 of the arms 82 are down in the normal position shown in Fig. 4. If, however, the upper part 89 of the two-part pin 88 of one or more of the jacks be raised to the position shown in Fig. 5, the pins so raised will engage the abutments 85 of the arms 82 and arrest the movements of the jacks connected thereto against their own elasticity and prevent their upper ends from being projected into either of the two planes occupied by the sets of threads 13 and 14, while the remaining jacks are projected by the rocking of the arm 68 on into the plane or planes occupied by the two sets of threads 13 and 14. Or, if the upper end 89 of the two-part pin 88 of one or more of the jacks be raised to the position shown in Fig. 6, by the raising of the lower parts 92 of the pins, the pins so raised will engage the abutments 86 of the arms 82 and arrest the movements of the jacks connected thereto against their own elasticity, after their upper ends have been projected into the plane occupied by the set of threads 13, while the remaining jacks are projected by the rocking of the bar 68 on into the plane occupied by the set of threads 14. It will therefore be seen that each time the bar 68 is rocked to project the upper ends of the jacks 67 into the planes occupied by the two sets of threads 13 and 14, certain of said jacks may be selected and held, independently of each other and of the remaining jacks, against being projected into the planes of said threads, or projected only into the plane occupied by the set of threads 13, while the remaining jacks are projected into the planes occupied by both sets of threads 13 and 14, by supplying electric current to either one of the two solenoids 96 and 97 of the two-part pin 88 of certain of said arms corresponding with the selected jacks. Thus the positions of the jacks with respect to the planes occupied by the two sets of threads 13 and 14 may be controlled independently of each other to affect the manner of interlacing the bobbin threads 22 with the spool and warp threads 13 and 14, and the character of the lace being produced.

I shall now describe the means for automatically supplying electric current to the solenoids 96 and 97 for the selection and control of the jacks during the operation of the machine, in accordance with a prescribed design to be produced in the lace or product of the loom.

Supported on the supplemental frame 5 is a frame 98 including two vertical plates 99 and 100 arranged in spaced relation to each other. Extending horizontally through perforations in these plates 99 and 100 is a set of reciprocative pins 101 which extend beyond the outer faces of the plates. Arranged adjacent one end of the set of pins 101 is a set of contact plates 102 corresponding in number with the pins 101. These contact plates 102 are secured to a plate 103 of insulating material which is secured to the frame 98 and which insulates the plates 102 from each other.

One contact plate 102 is in line with each pin 101, but normally out of contact therewith. The pins 101 are provided with transverse stop pins 104 which take against the plate 100 and limit the movement of the pins 101 in a direction away from the contact plates 102. The pins 101 are pressed normally in a direction away from the contact plates 102 by the action of springs 105 which encircle the pins 101 and bear against the plate 100, and transverse pins 106 extending through pins 101. The pins 101 are longitudinally movable independently of each other so that any or all of the pins may be projected against the action of the springs 105 into contact with the contact plates 102.

In rear of the set of pins 101 is an elongated square block 107 which is carried by a shaft 150 journaled in vertical plates 108 which extend downwardly from horizontal bars 109 arranged parallel to the pins 106 and slidingly fitted to guide-ways in the frame 98. Pivoted to the bars 109 are the rearward ends of arms 110, the forward ends of which are pivoted to the upper ends of arms 111 and 112 which are fixed to a rock shaft 113 having its bearings in the frame 98. The arm 111 extends downwardly from the shaft 113 and is in the form of a lever, the lower end of which is pivoted to an arm 114 extending from an eccentric strap 115 which surrounds an eccentric 116 carried by a shaft 117 journaled in bearings on the main frame 3. The shaft 117 is provided with a beveled gear wheel 118 which coacts with a similar wheel 119 on the upper end of an inclined shaft 120 which is journaled in bearings on the main frame 3. The lower end of the shaft 120 is provided with a beveled gear wheel 121 which coacts with a similar wheel 122 on the main driving shaft 6, whereby, during the operation of the loom, the rotation of the eccentric 116 will rock the lever 111 back and forth and thus rock the shaft 113 and cause the arms 110 to move the bars 109 back and forth, and thereby move the block 107 toward and from the rearward ends of the pins 101.

Extending over the block 107 and engaged with the upper and inner faces thereof is a chain of jacquard cards 123 which are hinged together on their longitudinal meeting edges in the usual manner. The cards 123 are provided with perforations 124 which are adapted to be engaged by projections 125 on the block 107 to advance the chain of cards 123 when the block is turned to bring the cards successively into proper registry with the faces of the block 107. The shaft 150 carries two plates 151 between which pins 152 extend, corresponding in number and position with the four corners of the block 107, as shown, and pivotally connected to the frame 98 as at 127 is one end of a pawl arm 128; the other or free end of which rests upon the pins 152. The free end of the pawl arm 128 is provided with a hook 129 which is adapted to engage the pins 152 successively and turn the block 107 a quarter turn each time the block is moved in a direction away from the pins 101. After the block 107 has been turned a quarter turn during the rearward movement thereof by the pawl arm 128, the block 107 comes to rest in the position shown in the drawings, in which the card 123 engaged with the forward face of the block is at right angles to the pins 101; and the block 107 is held in this position during the forward movement of the block by the arms 131 carried by and pivoted to the bars 109. Each arm 131 is drawn downwardly by a spring 126 into engagement with a square block 153 carried by the shaft 150 and the engagement of each arm 131 with one face of its block 153 each time the block 107 is turned holds the block 107 in position. It will thus be seen that as the block 107 is moved toward and from the pins 101, the cards 123 will be successively presented to the rearward ends of the pins 101. The jacquard cards are provided with the usual perforations 132 which are punched therein in accordance with a prescribed design, and which are located to select and receive certain of the pins 101 while the remaining pins are engaged by the body of the card and projected thereby against the action of their springs 105 into contact with their contact plates 102, the ends of the pins in line with the perforations 132 in the card passing through the perforations and into openings 133 in the block 107 and being unaffected by the card. The openings 133 are provided in the four faces of the block 107 and they correspond in number and position with the rearward ends of the pins 101 as each face of the block 107 is presented to the pins.

Each solenoid 96 of each two-part pin 88 is included in an electric circuit which also includes one of the contact plates 102 and the contact pin 101 in line therewith, which circuit is adapted to be closed and opened by the contact pin 101 being moved into and from engagement with the pin 102; and each solenoid 97 of each two-part pin 88 is included in an electric circuit which also includes one of the contact plates 102 and the contact pin 101 in line therewith, which circuit is adapted to be closed and opened by the contact pin 101 being moved into and from engagement with the plate 102.

In Fig. 8 of the drawings, I have shown, diagrammatically, the electrical connections for the two solenoids 96 and 97 of one two-part pin 88 for one arm 82 controlling one jack 67, the two solenoids being included in independent electric circuits which are closed and opened by two independent pins 101 making and breaking contact with two independent plates 102, and each arm 82 for each jack 67 is provided with a similar two-part pin 88 which is controlled by two solenoids included in independent electric circuits which are closed and opened by two independent pins 101 making and breaking contact with two independent plates 102. Therefore, the showing of the electrical connections of one two-part pin 88 for controlling one of the jacks 67 will suffice for all.

Referring now to Fig. 8, one end of the solenoid coil 96 is connected by a wire 135 to a contact plate 102$^a$ (being one plate of the set of contact plates 102), the other end of the solenoid coil 96 is connected to a wire 136 leading to an electric battery or source of electric current 137, and leading from the electric battery 137 is a wire 138 which is electrically connected to the plate 100 supporting the pin 101$^a$ electrically connected thereto, (which pin 101$^a$ is one pin of the set of pins 101), thus completing an electric circuit for the solenoid 96 which may be closed and opened by moving the pin 101$^a$ into and out of contact with the contact plate 102$^a$.

One end of the solenoid coil 97 is connected by a wire 139 to a contact plate 102ᵇ (being one plate of the set of contact plates 102), the other end of the solenoid coil 97 is connected to the wire 136 leading to the electric battery or source of electric current 137, and leading from the electric battery 137 is the wire 138 which is electrically connected to the plate 100 supporting the pin 101ᵇ electrically connected thereto, (which pin 101ᵇ is one pin of the set of pins 101), thus completing an electric circuit for the solenoid 97 which may be closed and opened by moving the pin 101ᵇ into and out of contact with the contact plate 102ᵇ.

For convenience of manufacturing and assembling the parts and making the electrical connections for the solenoids, I inclose each pair of solenoids 96 and 97 for each two-part pin 88 in a metal tube 142 which surrounds the solenoids 96 and 97 and is insulated from the central tube or solenoid core 87 by interposed top and bottom insulating rings 134 and 140 respectively, and a central insulating ring 141 located between the two solenoids, the upper insulating ring 134 being provided with a contact ring 143 out of contact with the tube 142; and the whole being supported by the central tube 87, the upper end of which may be applied to and removed from the plate 84 as desired. The outer tube 142 is engaged by a contact spring 144 and the contact ring 143 is engaged by a contact spring 145. The contact springs 144 and 145 are mounted on an insulating plate 146 secured to the bottom of the plate 84, the plate 146 insulating the springs 144 and 145 from each other.

One end of each solenoid coil 96 and 97 is electrically connected to the central tube 87 which is electrically connected to the plate 84 which, in turn, is electrically connected by a wire to the electric battery or source of electric current 137. This electrical connection corresponds with the wire 136 shown in Fig. 8, connecting one end of each solenoid with the source of electric current. Each pair of solenoids for each two-part pin 88 is similarly connected to the source of current. The other end of the upper solenoid coil 96 is electrically connected to the ring 143 which is engaged by the contact spring 145 which, in turn, is connected by a wire to one of the contact plates 102, the ring 143, the contact spring 145 and the wire leading therefrom to a contact plate 102 corresponding with the wire 135 shown in Fig. 8. The other end of the lower solenoid coil 97 is electrically connected to the outer tube 142 which is engaged by the contact spring 144 which, in turn, is connected by a wire to one of the contact plates 102, the tube 142, the contact spring 144 and the wire leading therefrom to a contact plate 102 corresponding with the wire 139 shown in Fig. 8. One end of each solenoid coil 96 and 97 of each two-part pin 88 is thus similarly connected to a contact plate 102, making an independent electric circuit for each solenoid which may be opened and closed by the pin 101 and contact plate 102 included in the circuit.

The timing of the shaft 117 with relation to the rocking of the bar 68 is such that before each rocking action of the bar 68 to project the upper ends of the jacks 67 into the planes of the two sets of threads 13 and 14, the eccentric 116 operates to advance the block 107 and the card on the front face thereof into engagement with the set of pins 101, and a new jacquard card 123 is presented to the pins 101 each time the block 107 moves forwardly. Thus a jacquard card 123 having the perforations 132 therein acts upon the pins 101 and selects and operates certain of the pins 101, and closes the electric circuits controlled thereby each time the bar 68 is moved to project the jacks into the planes of the two sets of threads 13 and 14, and the circuits closed by the pins 101 will energize the solenoids included therein which, in turn, will operate the two-part pins 88 controlled thereby and move said pins into one or the other of the two horizontal planes occupied by the abutments 85 and 86 of the arms 82 directly over said pins, and thus either prevent or limit the movement of certain or all of the jacks 67 connected to said arms, while the remaining jacks are permitted to move into the planes of both sets of threads 13 and 14; the abutments 85 preventing the movement of certain jacks into the planes occupied by both sets of threads 13 and 14, and the abutments 86 permitting certain jacks 67 to be moved into the plane occupied by the set of threads 13 and preventing them from being moved into the plane occupied by the set of threads 14, in accordance with the operation of the two-part pins 88.

By the construction and operation of the parts hereinbefore described, it will be seen that the design in the lace or product of the machine is controlled by the selection and operation of the jacks or thread-selecting devices 67. It will also be seen that each jack is controlled independently of the remaining jacks by two electric circuits which are closed and opened independently of each other by two of the contact making and breaking pins 101; and it will also be seen that the jacks 67 are independently selected and controlled by operating the contact pins 101 independently of each other and that the contact pins 101 are operated independently of each other by the chain of jacquard cards 123. It therefore follows that if the chain of jacquard cards 123 be perforated in accordance with a prescribed design to be produced in the lace or product of the loom, the pins 101 and perforce the jacks 67 will be independently selected and controlled in accordance with the perforations in the cards for the production of the desired design.

While I have herein shown and described my invention in a desirable and practicable form, I desire it to be understood that I do not limit myself to this particular construction, as the same may be greatly modified without departing from my invention; and particularly the automatic mechanism for closing and opening the electric circuits in accordance with a prescribed design is capable of wide variation without departing from my invention.

Having thus described my invention, I claim as new and desire to secure by Letters Patent:—

1. In a lace machine, the combination with the frame thereof, means for supporting two sets of threads and moving threads of one set between and around threads of the other set, of yielding jacks movable independently of each other for controlling the operation of threads of one set with respect to threads of the other set, each jack being provided with a part having a stop-engaging face, means for moving said jacks, stops movable independently of each other into and from the paths of movement of said stop-engaging faces, means for moving said stops independently of each other into and from said paths, the last named means including an electric circuit for each stop, and means for opening and closing said circuits independently of each other.

2. In a lace machine, the combination with the frame thereof, means for supporting three sets of threads and moving threads of one set between and around threads of the other two sets, of yielding jacks movable independently of each other for controlling the operation of threads of two of said sets of threads with respect to threads of the third set of threads, each jack being provided with a part having two stop-engaging faces, means for moving said jacks, independently movable stops for said parts, each stop being movable into and from the paths of movement of the stop-engaging faces of one of said parts, means for moving said stops independently of each other including two electric circuits for each of said parts, one circuit controlling the stop with respect to one stop-engaging face and the other circuit controlling the stop with respect to the other stop-engaging face, and means for opening and closing said circuits independently of each other.

3. In a lace machine, the combination with the frame thereof, means for supporting two sets of threads and moving threads of one set between and around threads of the other set, and devices movable independently of each other for controlling the operation of threads of one set with respect to threads of the other set, of means for controlling said devices independently of each other including an electric circuit for each device, a series of jacquard cards, means for moving said cards, and means operated by said cards for opening and closing said circuits independently of each other.

4. In a lace machine, the combination with the frame thereof, means for supporting three sets of threads and moving threads of one set between and around threads of the other two sets, and devices movable independently of each other for controlling the operation of threads of two of said sets of threads with respect to threads of the third set of threads, of means for controlling said devices independently of each other including two electric circuits for each device, one circuit controlling the device with respect to one set of threads and one circuit controlling the device with respect to another set of threads, a series of jacquard cards, means for moving said cards, and means operated by said cards for opening and closing said circuits independently of each other.

5. In a lace machine, the combination with the frame thereof, means for supporting two sets of threads and moving threads of one set between and around threads of the other set, and thread-controlling jacks movable independently of each other for controlling threads of one set with respect to threads of the other set, of means for controlling the extent of movement of said jacks independently of each other including an electric circuit for each jack, a series of jacquard cards, means for moving said cards, and means operated by said cards for opening and closing said circuits independently of each other.

6. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of means for controlling the movements of said jacks independently of each other including two electric circuits for each jack, one circuit controlling the extent of movement of the jack with respect to one set of jack-controlled threads and one circuit controlling the extent of movement of the jack with respect to the other set of jack-controlled threads, a series of jacquard cards, means for moving said cards, and means operated by said cards for opening and closing said circuits independently of each other.

7. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, an electric circuit for each arm, means operated by each circuit for engaging one of said arms and limiting the movement of its jack, and means for opening and closing said circuits independently of each other.

8. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, each arm being provided with an abutment, an electric circuit for each arm provided with means operated by the circuit for engaging the abutment of one of said arms to limit its movement, and means for opening and closing said circuits independently of each other.

9. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of arms extending from said jacks, each arm being provided with two abutments facing the same direction, two electric circuits for each arm, means operated by one circuit of one arm to engage one of its abutments and by the other circuit of the arm to engage its other abutment and limit its movement, and means for opening and closing said circuits independently of each other.

10. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, each arm being provided with an abutment, an electric circuit for each arm, a reciprocative pin operated by each circuit to engage the abutment of one of said arms to limit its movement, and means for opening and closing said circuits independently of each other.

11. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of arms extending from said jacks, each arm being provided with two abutments facing the same direction, two electric circuits for each arm, a reciprocative pin operated by one circuit of one arm to engage one of its abutments and by the other circuit of the arm to engage its other abutment and limit its movement, and means for opening and closing said circuits independently of each other.

12. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, each arm being provided with an abutment, a reciprocative pin for each arm movable into and out of the path of the arm abutment, an electro-magnet for operating each pin, an electric circuit for each magnet, and means for opening and closing said circuits independently of each other.

13. In a lace machine, the combination with the frame thereof, means for supporting three sets of threads and for moving threads of one set between and around threads of the other two sets, and thread-controlling jacks movable independently of each other for controlling threads of two of said sets of threads with respect to threads of the third set of threads, of arms extending from said jacks, each arm being provided with two abutments facing the same direction in different horizontal planes and in parallel vertical planes transversely of said arm, a two-part reciprocative pin for each arm, one part thereof being movable into and out of said horizontal planes, an electromagnet for each part of each two part pin, one magnet being located to operate one part of a pin and move it into one horizontal plane and the other magnet being located to operate the other part of the pin and move the first named part thereof into the other horizontal plane, an electric circuit for each magnet, and means for opening and closing said circuits independently of each other.

14. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, each arm being provided with an abutment, a support provided with guide-slots into which said arms extend, an electric circuit for each arm provided with means operated by the circuit for engaging the abutment of one of said arms to limit its movement, and means for opening and closing said circuits independently of each other.

15. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of arms extending from said jacks, each arm being provided with two abutments facing the same direction, a support provided with guide-slots into which said arms extend, two electric circuits for each arm, means operated by one circuit of one arm to engage one of its abutments and by the other circuits of the arm to engage its other abutment and limit its movement, and means for opening and closing said circuits independently of each other.

16. In a lace machine, the combination with the frame thereof, means for supporting two sets of threads and moving threads of one set between and around threads of the other set, and devices movable independently of each other for controlling the operation of threads of one set with respect to threads of the other set, of means for controlling said devices independently of each other including an electric circuit for each device, each circuit being provided with an opening and closing device including a spring-pressed pin, a series of jacquard cards for operating said pins to open and close said circuits independently of each other, and means for moving said cards.

17. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of means for controlling said devices independently of each other including two electric circuits for each device, one circuit controlling the device with respect to one set of threads and one circuit controlling the device with respect to another set of threads, each circuit being provided with an opening and closing device including a spring-pressed pin, a series of jacquard cards for operating said pins to open and close said circuits independently of each other, and means for moving said cards.

18. In a lace machine, the combination with the frame thereof, means for supporting two sets of threads and moving threads of one set between and around threads of the other set, and thread-controlling jacks movable independently of each other for controlling threads of one set with respect to threads of the other set, of arms extending from said jacks, an electric circuit for each arm, means operated by each circuit for engaging one of said arms and limiting the movement of its jack, each circuit being provided with an opening and closing device including a spring-pressed pin, a series of jacquard cards for operating said pins to open and close said circuits independently of each other, and means for moving said cards.

19. In a lace machine, the combination with the frame thereof, means for supporting two sets of threads and moving threads of one set between and around threads of the other set, and thread-controlling jacks movable independently of each other for controlling threads of one set with respect to threads of the other set, means for moving said jacks, of arms extending from said jacks, each arm being provided with an abutment, an electric circuit for each arm provided with means operated by the circuit for engaging the abutment of one of said arms to limit its movement, each circuit being provided with an opening and closing device including a spring-pressed pin, a series of jacquard cards for operating said pins to open and close said circuits independently of each other, and means for moving said cards.

20. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of arms extending from said jacks, each arm being provided with two abutments facing the same direction, two electric circuits for each arm, means operated by one circuit of one arm to engage one of its abutments and by the other circuit of the arm to engage its other abutment and limit its movement, each circuit being provided with an opening and closing device including a spring-pressed pin, a series of jacquard cards for operating said pins to open and close said circuits independently of each other, and means for moving said cards.

21. In a lace machine, the combination with the frame thereof, means for supporting three sets of threads and moving threads of one set between and around threads of the other two sets, and thread-controlling jacks movable independently of each other for controlling threads of two of said sets of threads with respect to threads of the third set of threads, of means for controlling the movements of said jacks independently of each other including two electric circuits for each jack, one circuit controlling the extent of movement of the jack with respect to one set of jack-controlled threads and one circuit controlling the extent of movement of the jack with respect to the other set of jack-controlled threads, and means for automatically opening and closing said circuits independently of each other in accordance with a prescribed design during the operation of the loom.

In testimony whereof, I have hereunto affixed my signature this thirtieth day of June A. D. 1909.

JOSEPH H. BROMLEY, JR.

Witnesses:
RALPH H. GAMBLE,
A. V. GROUPE.